United States Patent [19]

Shimizu

[11] 4,358,558

[45] Nov. 9, 1982

[54] ROOM TEMPERATURE CURABLE POLYORGANOSILOXANE COMPOSITIONS

[75] Inventor: Chiyuki Shimizu, Ota, Japan

[73] Assignee: Toshiba Silicones Ltd., Japan

[21] Appl. No.: 334,014

[22] Filed: Dec. 23, 1981

[30] Foreign Application Priority Data

Dec. 26, 1980 [JP] Japan .................................. 55/186167

[51] Int. Cl.$^3$ ................................................ C08K 5/05
[52] U.S. Cl. ..................................... 524/379; 524/384; 524/385; 524/389; 524/413; 524/448; 524/492; 524/497; 524/588; 524/847; 524/425; 528/33; 528/34; 528/901

[58] Field of Search ............... 524/384, 385, 847, 588, 524/425, 413, 448, 492, 497, 379, 389; 528/33, 34, 901

[56] References Cited

U.S. PATENT DOCUMENTS 3,933,880 1/1976 Bergstrom et al. .................... 528/15
4,221,896 9/1980 Endo .................................. 528/901

*Primary Examiner*—Melvyn I. Marquis

[57] ABSTRACT

There is provided a paintable room temperature curable polyorganosiloxane composition which is comprised of a silanol-terminated polydiorganosiloxane, an aminoxy functional organosilicon compound, an inorganic filler and a monohydric unsaturated alcohol containing a carbon-to-carbon triple bond and a hydroxyl group bonded with a primary or secondary carbon atom.

8 Claims, No Drawings

ROOM TEMPERATURE CURABLE POLYORGANOSILOXANE COMPOSITIONS

This application claims priority over Japanese Patent Application No. 186167/1980 filed Dec. 26, 1980.

BACKGROUND OF THE INVENTION

The present invention relates to a room temperature curable polyorganosiloxane composition suitable for use as a silicone sealant having a paintable surface.

Among polyorganosiloxane compositions which cure into an elastomer at room temperature, various compositions have been known. Particularly in the construction industry, such polyorganosiloxane compositions are used frequently for various purposes such as glazing of glass plates in sashes, sealing of apertures in outer walls of constructions such as precast concrete and molded aluminum plates and sealing of joints in concrete panels and induced joints. They are known generally as silicone sealants. The demand for them is increasing, since they have excellent weather resistance, durability, heat resistance and low temperature resistance, change in physical properties thereof with temperature is insignificant, deterioration by ozone or ultraviolet rays is only slight and they have good workability. Among such silicone sealants those which are curable to elastomers at room temperature by crosslinking silanol group-terminated polydiorganosiloxanes with an aminoxy group-containing organosilicon compound are particularly important as caulking and sealants for outer walls of constructions, particularly high-storied buildings, and since the above silicone sealants having a low modulus can be obtained easily. The sealant which has a low modulus is capable of absorbing a stress caused by the deformation of the constructions and also by the expansion and contraction of the construction materials.

However, the silicone sealants have a defect in that general organic resin paints or cement paints cannot be adhered thereto because of their poor adhesive receptivity.

On the other hand, outer walls of constructions made of concrete, precast concrete, lightweight concrete and lightweight foamed concrete are often after-coated for the purpose of improving the appearance thereof or imparting water-tightness thereto. Therefore, it is desirable that the surface of the sealant filled in the joints of the outer walls can also be applied with the coating. However, as described above, general paints applied to the surface of silicone sealant have no adhesive receptivity and paint will peel off.

A prior method for indirectly ahering a general paint to the surface of a silicone sealant is comprised of the steps of applying a mixture of (1) a viscous polyorganosiloxane resin solution as a mark component which is obtained by reacting (a) a copolymer comprising triorganosiloxane units and $SiO_2$ units and having a hydroxyl or alkoxyl group bonded to silicon and (b) a silanol group-terminated polydiorganosiloxane and (2) a filler; which mixture is applied to a surface; drying the mixture and applying a general paint to the surface thereof.

However, this method is not preferred since it comprises complicated steps.

After intensive investigations on silicone sealants to which general paints can be adhered, the inventors have found that if a primary or secondary monohydric alcohol having a carbon-to-carbon triple bond in the molecule is added thereto, the surface of the cured sealant will have adhesive properties and paints can easily be adhered thereto. The present invention has been completed on the basis of this finding.

SUMMARY OF THE INVENTION

The composition of the present invention is characterized in that the inside of the composition obtained by the present invention has an elasticity suitable for use as a sealant after curing but the surface thereof remains adhesive and, therefore, exhibits receptivity for general paints.

The present invention relates to a room temperature curable polyorganosiloxane composition characterized by comprising:

(A) 100 parts by weight of a silanol-terminated polydiorganosiloxane having a viscosity at 25° C. of 100–200,000 cSt, (B) 0.1–30 parts by weight of an aminoxy group-containing organosilicon compound containing an average of more than 2 organoaminoxy groups in the molecule, (C) 5–300 parts by weight of an inorganic filler, and (D) 0.01–10 parts by weight of a monohydric unsaturated alcohol containing a carbon-to-carbon triple bond and a hydroxyl group bonded with a primary or secondary carbon atom.

Component (A) used in the present invention is a silanol-terminated polydiorganosiloxane generally used for the preparation of a condensed polysiloxane composition which can cure at room temperature. For attaining a suitable workability of the composition and also for obtaining physical properties suitable for use as construction sealant, component (A) should have a viscosity at 25° C. in the range of 100–200,000 cSt. If the viscosity is less than 100 cSt, the elongation of the cured composition is insufficient. If the viscosity is higher than 200,000 cSt, the homogeneous composition is difficult to obtain and the extrusion workability is reduced. A particularly preferred viscosity range in which both properties are well balanced is 500–50,000 cSt.

As the organic groups directly bonded with the silicon atom, there may be mentioned, for example, alkyl groups such as methyl groups, ethyl groups, propyl groups, butyl groups and hexyl groups; alkenyl groups such as vinyl groups and allyl groups; aryl groups such as phenyl groups; aralkyl groups such as beta-phenylethyl groups and monovalent substituted hydrocarbon groups such as 3,3,3-trifluoropropyl groups, chloromethyl groups and beta-cyanoethyl groups. From the viewpoint of ease of synthesis, monovalent hydrocarbon groups such as methyl groups, vinyl groups and phenyl groups are generally advantageous. Among them, methyl groups are preferred, since a starting intermediate thereof is obtained most easily, and it realizes the lowest siloxane viscosity for a given polymerization degree and has well balanced extrusion workability and physical properties. Thus, it is preferred that at least 85% of the total organic groups are methyl groups. It is particularly preferred that substantially all of the organic groups are methyl groups. In case low temperature properties and heat resistance are required, it is recommended that a part of the organic groups are replaced by phenyl groups.

The aminoxy group-containing organosilicon compound used as component (B) in the present invention is subjected to a hydroxylamine-releasing reaction with the terminal silanol group of component (A), thereby crosslinking and lengthening the polysiloxane chain.

Component (B) may be either a silane derivative or linear, cyclic or branched siloxane derivative. In order to show an excellent reactivity and obtain a sealant which has a high elongation, a combination of cyclic polysiloxanes having two and three aminoxy groups in the molecules is preferred. As the organic groups bonded with the aminoxy group, there may be mentioned, for example, two monovalent hydrocarbon groups such as methyl groups, ethyl groups, propyl groups, butyl groups and cyclohexyl groups or a divalent hydrocarbon group such as butylene group or pentene group. In view of availability, easy synthesis and reactivity of the starting material, and ease of volatilization of organohydroxylamine released, an ethyl group is preferred. Among the aminoxy group-containing organosilicon compounds, the following compounds may be mentioned. To simplify molecular formulas, the following symbols are used:

Me = methyl group, Et = ethyl group, Bu = butyl group,

Vi = vinyl group, Ph = phenyl group.

Si(ONEt$_2$)$_4$, MeSi(ONEt$_2$)$_3$, PhSi(ONMe$_2$)$_3$, PhSi(ONEt$_2$)$_3$,

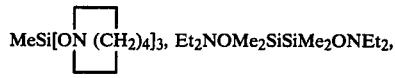, Et$_2$NOMe$_2$SiSiMe$_2$ONEt$_2$,

Et$_2$NOMe$_2$SiOSiMe$_2$ONEt$_2$,

Et$_2$NOMe$_2$SiOPh$_2$SiOSiMe$_2$ONEt$_2$,

Me$_3$SiO[MeSiO]$_2$SiMe$_3$, [MeSiO]$_4$, 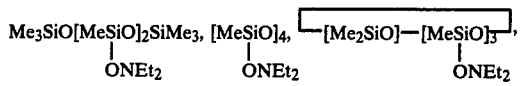

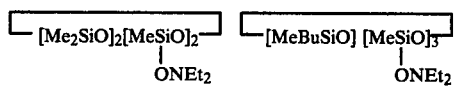

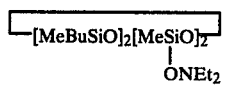

MeSi[OMe$_2$SiONEt$_2$]$_3$, PhSi[OMe$_2$SiONEt$_2$]$_3$

The amount of the aminoxy group-containing organosilicon compound is in the range of 0.1–30 parts by weight, preferably 1–15 parts by weight, per 100 parts by weight of component (A). If the amount of the aminoxy group-containing organosilicon compound is less than 0.1 part by weight, the reaction velocity with the silanol-terminated polydiorganosiloxane is too high to obtain a sufficient operating time. If the amount is more than 30 parts by weight, the development of elasticity of the composition is insufficient.

Component (C) according to the present invention is used for realizing a suitable fluidity or non-fluidity of the composition depending on the use and treatment conditions and a mechanical strength and hardness required of construction sealants and is preferably a fine inorganic powder. As the base of component (C), there may be mentioned fumed silica, precipitated silica, silica aerogel, ground silica, diatomaceous earth, iron oxides, titanium oxides and calcium carbonate. Particularly, calcium carbonate is preferred, since the composition can easily obtain a high elongation. These inorganic fillers may be used either alone or in the form of a mixture of two or more of them.

The amount of the inorganic filler is in the range of 5–300 parts by weight, preferably 30–200 parts by weight, per 100 parts by weight of component (A). If the amount of component (C) is smaller than the above range, physical properties required of the composition cannot be obtained and, on the other hand, if the amount is excessive, the workability is reduced.

A pigment such as titanium oxide, cobalt oxide, red iron oxide, carbon black or phthalocyanine pigment may be added to the composition in an amount suitable for coloring.

Component (D) according to the present invention is an indispensable component for obtaining the composition having a specific curing property, i.e. a composition wherein the inside is cured to exhibit an elasticity suitable for use as sealant but the exposed surface of which has an adhesiveness which exhibits a receptivity for general paints. Component (D) is selected from the group consisting of monohydric unsaturated alcohols containing a carbon-to-carbon triple bond. In those unsaturated alcohols, the alcoholic hydroxyl group must be bonded with a primary or secondary carbon atom. If the hydroxyl group is bonded with a tertiary carbon atom, the adhesiveness on the surface of the composition cannot be realized. Consequently, such a composition is unsuitable for use in the present invention. Polyhydric alcohols are also unsuitable. However, the tertiary alcohols and polyhydric alcohols may be contained in component (D) as impurities.

As component (D), suitable unsaturated alcohols have the general formula:

$$R^1-C\equiv C-R^2-OH$$

wherein $R^1$ represents a hydrogen atom or a monovalent hydrocarbon group and $R^2$ represents a divalent hydrocarbon group.

As examples of the unsaturated alcohols, the following compounds may be mentioned:

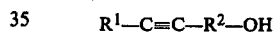

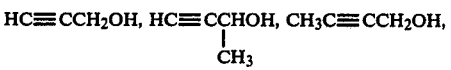

$CH_3(CH_2)_2C\equiv CCH_2OH$, $CH_3CH_2C\equiv C(CH_2)_1OH$,

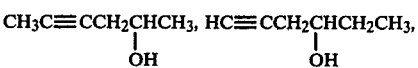

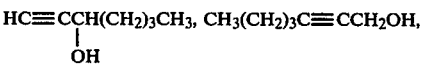

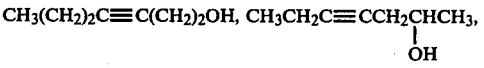

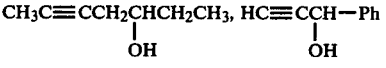

The amount of component (D) is preferably in the range of 0.01–10 parts by weight, particularly 0.05–5 parts by weight, per 100 parts by weight of component (A). If the amount of component (D) is smaller than the above range, the adhesiveness of the surface of the composition which is the characteristic feature of the present invention is poor and a sufficient paint receptivity cannot be obtained. If the amount is larger, the surface of the composition obtained tends to resemble an uncured surface and a sufficient paint receptivity also cannot be obtained.

The inside of the composition obtained by the present invention is cured and has an excellent elasticity but the surface thereof has an adhesiveness necessary for paintability.

The composition obtained by the present invention is suitable for use as a sealant for constructions which require aftercoating.

The following examples further illustrate the present invention, in which parts are given by weight.

EXAMPLE 1

100 parts by weight of a silanol-terminated polydimethylsiloxane having a viscosity at 25° C. of 5,000 cSt were mixed with 50 parts of heavy calcium carbonate having an average particle diameter of 1 micron and 50 parts of light calcium carbonate treated with stearic acid and having an average particle diameter of 0.2 microns by means of a kneader to obtain a base compound. To 100 parts of the base compound were added 3.0 parts of a crosslinking mixture comprising 94 wt. % of

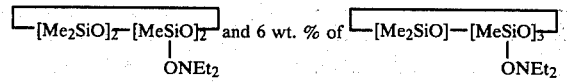

and an unsaturated alcohol as shown in Table 1 thereby obtaining Samples 10–15. Sample 10, free of the unsaturated alcohol, was prepared for comparison.

Samples 10–15 were applied to slate plates in a thickness of 15 mm and then cured at room temperature for 14 days. Thereafter, a paint shown in Table 1 was applied to the surface of each sample by means of a paint brush. After drying at room temperature for 7 days, a glass cloth tape having a width of 20 mm was applied thereto by means of a cyanoacrylate adhesive (Aron Alpha; a product of Toa Gosei Kagaku Co., Ltd.). Then, an end of the glass cloth tape was pulled to examine the peel stress between the coating film and the sample. Further, test pieces as shown in FIG. 1 were prepared from samples 10–15, cured at ambient temperature for 14 days and subjected to the tensile test. A specimen of each sample from each test piece was cut and its cured state was also observed. The results are shown in Table 1.

EXAMPLE 2

100 parts by weight of a silanol-terminated polydimethylsiloxane having a viscosity at 25° C. of 3,000 cSt was mixed with 65 parts by weight of rosin acid-treated colloidal calcium carbonate by means of a kneader to obtain a base compound.

100 parts by weight of the base compound was mixed with 3.5 parts of a crosslinking mixture comprising 95 wt. % of

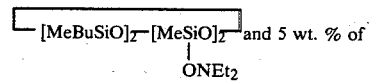

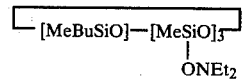

and an unsaturated alcohol shown in Table 2 to obtain Samples 20–25. Sample 20, free of the unsaturated alcohol, was prepared for comparison.

Samples 20–25 were subjected to the same tests as in Example 1 to obtain the results shown in Table 2.

EXAMPLE 3

100 parts of a silanol-terminated polydimethylsiloxane having a viscosity at 25° C. of 12,000 cSt were mixed with 50 parts of light calcium carbonate having an average particle diameter of 0.5 microns and 25 parts of colloidal calcium carbonate treated with stearic acid and having an average particle diameter of 0.05 microns to obtain a base compound. 100 parts of the base compound were mixed with 2.5 parts of a crosslinking mixture comprising 93 wt. % of

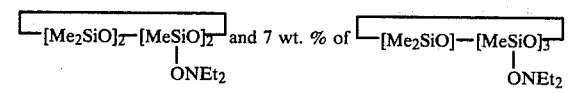

and an unsaturated alcohol shown in Table 3 to obtain Samples 30–33. Sample 30, free of the unsaturated alcohol, was prepared for comparison.

From Samples 30–33, test pieces were prepared. After curing the test pieces at room temperature for 14 days, paints shown in Table 3 were applied to the surfaces thereof by means of a paint brush. After curing at ambient temperature for 7 days followed by drying, the test pieces were mounted on a fatigue tester and tested repeatedly. States of the paints after 2,000 cycles of displacement of ±10% based on the width of the samples filled in the joints were examined to obtain the results shown in Table 3.

TABLE 1

| Alcohol | (Comp. Ex.) 10 | Sample 11 | 12 | 13 | 14 | 15 |
|---|---|---|---|---|---|---|
| HC≡CCH$_2$OH | — | 0.15$^{part}$ | 0.25$^{part}$ | 0.4$^{part}$ | — | — |
| HC≡CCHOH<br>\|<br>CH$_3$ | — | — | — | — | 0.75$^{part}$ | — |
| CH$_3$C≡CCH$_2$OH | — | — | — | — | — | 0.25$^{part}$ |
| Peel stress for paints(kgf/cm) | | | | | | |
| Vinylose*$^1$ (Dai-Nihon Paint Co.) | Immeasurable (easily peeled off) | 1.02 | 1.45 | 0.88 | 1.75 | 1.10 |

TABLE 1-continued

| Alcohol | (Comp. Ex.) 10 | Sample 11 | 12 | 13 | 14 | 15 |
|---|---|---|---|---|---|---|
| AP Enamel[*2] (Kansai Paint Co.) | Immeasurable (easily peeled off) | 1.07 | 1.33 | 1.01 | 1.36 | 1.18 |
| Neo Gosei #2300[*3] (Shinto Paint Co.) | Immeasurable (easily peeled off) | 1.15 | 1.69 | 1.30 | 1.35 | 1.25 |
| V Top[*4] (Dai-Nihon Paint Co.) | Immeasurable (easily peeled off) | 1.15 | 1.40 | 0.92 | 1.55 | 1.22 |
| Plastoloy PS-101[*5] (Fujikura Kasei Co.) | Immeasurable (easily peeled off) | 0.90 | 1.35 | 0.90 | 1.00 | 0.98 |
| Tensile test results | | | | | | |
| 50% Modulus (kgf/cm$^2$) | 1.30 | 1.25 | 1.20 | 1.00 | 1.05 | 1.10 |
| Maximum tensile stress | 4.6 | 4.1 | 3.9 | 3.6 | 3.7 | 4.1 |
| Elongation at break-down % | 1110 | 1150 | 1240 | 1290 | 1230 | 1370 |
| Curing | | | | | | |
| Inside | cured | cured | cured | cured | cured | cured |
| Surface | cured | semicured, adhesive | semicured, adhesive | semicured, adhesive | semicured, adhesive | semicured, adhesive |

Notes
[*1] Polyvinylchloride enamel
[*2] Acrylic enamel
[*3] Thick film epoxy enamel of two-component type
[*4] Acrylic polyurethane enamel
[*5] Aqueous emulsion of thick film acrylic paint

TABLE 2

| Alcohol | (Comp.Ex.) 20 | Sample 21 | 22 | 23 | 24 | 25 |
|---|---|---|---|---|---|---|
| HC≡CCH$_2$OH | — | 0.3$^{part}$ | — | — | — | — |
| HC≡C(CH$_2$)$_2$OH | — | — | 0.25$^{part}$ | — | — | — |
| CH$_3$(CH$_2$)$_2$C≡CCH$_2$OH | — | — | — | 0.2$^{part}$ | — | — |
| HC≡CCH$_2$CHCH$_2$CH$_3$ \| OH | — | — | — | — | 0.75$^{part}$ | — |
| CH$_3$(CH$_2$)$_2$C≡C(CH$_2$)$_2$OH | — | — | — | — | — | 0.2$^{part}$ |
| Peel stress for paints (kgf/cm) | | | | | | |
| Vinylose | Immeasurable (easily peeled off) | 1.96 | 1.54 | 1.62 | 1.33 | 1.05 |
| AP Enamel | Immeasurable (easily peeled off) | 1.80 | 1.55 | 1.59 | 1.25 | 0.99 |
| Opia #3000[*6] (Shinto Paint Co.) | Immeasurable (easily peeled off) | 1.84 | 1.60 | 1.43 | 1.36 | 0.91 |
| V Top | Immeasurable (easily peeled off) | 2.01 | 1.89 | 1.59 | 1.40 | 0.88 |
| Aron Coat ST[*7] (Toa Gosei Kagaku) | Immeasurable (easily peeled off) | 1.73 | 1.67 | 1.50 | 1.24 | 0.86 |
| Tensile test results | | | | | | |
| 50% Modulus kgf/cm$^2$ | 2.2 | 2.0 | 1.7 | 1.7 | 1.9 | 1.5 |
| Maximum tensile stress (kgf/cm$^2$) | 6.8 | 5.6 | 5.4 | 5.6 | 6.0 | 3.8 |
| Elongation at break-down | 1060 | 1230 | 1300 | 1310 | 1110 | 1420 |
| Curing | | | | | | |
| Inside | cured | cured | cured | cured | cured | cured |
| Surface | cured | semicured, adhesive | semicured, adhesive | semicured, adhesive | semicured, adhesive | semicured adhesive |

Notes
[*6] Tar epoxy paint, two component type
[*7] Thick film, elastic acrylic emulsion

TABLE 3

| | Sample | | | |
|---|---|---|---|---|
| | (Comp. Ex.) 30 | 31 | 32 | 33 |
| Alcohol | | | | |
| HC≡CCH$_2$OH | — | 0.25$^{part}$ | — | — |
| CH$_3$C≡CCH$_2$OH | — | — | 0.25$^{part}$ | — |
| HC≡C(CH$_2$)$_2$OH | — | — | — | 0.25$^{part}$ |
| Adhesion of paint after fatique test | | | | |
| Vinylose | Peeled off | The adhesion was excellent, though cracks were caused in the coating film. | The adhesion was excellent, though cracks were caused in the coating film. | The adhesion was excellent, though cracks were caused in the coating film. |
| Opia #3000 | Peeled off | The adhesion was excellent, though cracks were caused in the coating film. | The adhesion was excellent, though cracks were caused in the coating film. | The adhesion was excellent, though cracks were caused in the coating film. |
| Aron Coat ST | Peeled off | No change | No change | No change |

I claim:

1. A room temperature curable polyorganosiloxane composition comprising:
   (A) 100 parts by weight of a silanol group-terminated polydiorganosiloxane having a viscosity at 25° C. of 100–200,000 cSt;
   (B) 0.1–30 parts by weight of an aminoxy group-containing organosilicon compound containing an average of more than 2 organoaminoxy groups per molecule;
   (C) 5–300 parts by weight of an inorganic filler, and
   (D) 0.01–10 parts by weight of a monohydric unsaturated alcohol containing a carbon-to-carbon triple bond and a hydroxyl group bonded with a primary or secondary carbon atom.

2. A composition according to claim 1 wherein component (D) is an unsaturated alcohol of the general formula:

$$R^1-C\equiv C-R^2-OH$$

wherein $R^1$ represents a hydrogen atom or a monovalent hydrocarbon group and $R^2$ represents a divalent hydrocarbon group.

3. A composition according to claim 1 wherein at least 85% of the organic groups of component (A) are methyl groups.

4. A composition according to claim 3 wherein all the organic groups of component (A) are methyl groups.

5. A composition according to claim 1 wherein component (A) has a viscosity at 25° C. of 500–50,000 cSt.

6. A composition according to claim 1 wherein the organic group bonded with the aminoxy group of component (B) is an ethyl group.

7. A composition according to claim 1 wherein the inorganic filler (C) is calcium carbonate.

8. A composition according to claim 1 wherein component (C) is used in an amount of 0.05–5 parts by weight.

* * * * *